(12) United States Patent
Bardy (10) Patent No.: US 10,728,204 B2
(45) Date of Patent: Jul. 28, 2020

(54) SYSTEM AND METHOD FOR FACILITATING ONLINE OPINION SHARING ABOUT PROXIMATE MOTOR VEHICLES WITH THE AID OF A DIGITAL COMPUTER

(71) Applicant: Gust H. Bardy, Carnation, WA (US)

(72) Inventor: Gust H. Bardy, Carnation, WA (US)

(*) Notice: Subject to any disclaimer, the term of this patent is extended or adjusted under 35 U.S.C. 154(b) by 0 days.

(21) Appl. No.: 16/504,213

(22) Filed: Jul. 5, 2019

(65) Prior Publication Data
US 2019/0334852 A1 Oct. 31, 2019

Related U.S. Application Data

(63) Continuation-in-part of application No. 13/928,292, filed on Jun. 26, 2013, now abandoned.

(51) Int. Cl.
| | |
|---|---|
| *G06Q 40/00* | (2012.01) |
| *H04L 12/58* | (2006.01) |
| *H04N 5/225* | (2006.01) |
| *H04W 4/80* | (2018.01) |
| *H04W 4/46* | (2018.01) |

(52) U.S. Cl.
CPC ........... *H04L 51/32* (2013.01); *H04N 5/2252* (2013.01); *H04W 4/46* (2018.02); *H04W 4/80* (2018.02)

(58) Field of Classification Search
USPC ....... 705/4, 5, 39, 38, 37, 40, 41, 26.81, 12; 235/375, 386; 709/225; 707/734
See application file for complete search history.

(56) References Cited

U.S. PATENT DOCUMENTS

| | | | |
|---|---|---|---|
| 6,865,480 B2 * | 3/2005 | Wong ................ | G01C 21/3694 340/988 |
| 7,478,492 B2 | 1/2009 | Madonia | |
| 8,094,182 B2 * | 1/2012 | Park ........................ | G06T 7/80 348/36 |
| 8,149,136 B2 | 4/2012 | Feroldi | |
| 8,896,684 B2 * | 11/2014 | Muresan ................. | H04N 7/18 348/115 |

(Continued)

OTHER PUBLICATIONS

Following Trendsetters: Collective Decisions in Online Social Networks, 2012 45th Hawaii International Conference on System Sciences (pp. 764-773), Sakamoto, Y., Jan. 1, 2012. (Year: 2012).*

(Continued)

*Primary Examiner* — Tien C Nguyen
(74) *Attorney, Agent, or Firm* — Patrick J. S. Inouye; Leonid Kisselev (57) ABSTRACT

A system and method for facilitating online opinion sharing about proximate motor vehicles with the aid of a digital computer. Motor vehicle identifying indicia uniquely identifying a motor vehicle about which an opinion can be shared is received from a voter who accessed a voter entry page of an online motor vehicle voting service via a user interface. The identifying indicia can be obtained using a computing device executing a mobile application, which can interface with a variety of devices to obtain the indicia. The voter is redirected from the voter entry page to a voting page of a social networking site for sharing the opinion. Then, a plurality of opinions about the motor vehicle is tallied. The voter and the driver of the vehicle can exchange messages.

20 Claims, 4 Drawing Sheets

(56) References Cited

U.S. PATENT DOCUMENTS

| | | | | |
|---|---|---|---|---|
| 9,147,119 B2* | 9/2015 | Prakash | ............ | G06K 9/00791 |
| 2002/0161657 A1* | 10/2002 | Kojac | ............ | G06Q 30/02 |
| | | | | 705/26.1 |
| 2006/0163350 A1* | 7/2006 | Melton | ............ | G06K 17/00 |
| | | | | 235/435 |
| 2006/0292984 A1* | 12/2006 | Teate | ............ | G08G 1/123 |
| | | | | 455/41.2 |
| 2007/0229268 A1* | 10/2007 | Swan | ............ | G08B 21/24 |
| | | | | 340/572.1 |
| 2008/0238719 A1* | 10/2008 | Marchasin | ............ | G08G 1/017 |
| | | | | 340/901 |
| 2009/0037414 A1* | 2/2009 | Olivier | ............ | G06Q 30/02 |
| 2010/0265104 A1* | 10/2010 | Zlojutro | ............ | G07C 5/008 |
| | | | | 340/990 |
| 2010/0289625 A1* | 11/2010 | Park | ............ | G06K 19/0723 |
| | | | | 340/10.42 |
| 2011/0035445 A1 | 2/2011 | Eickhoff | | |
| 2011/0282564 A1* | 11/2011 | Park | ............ | G06Q 10/06 |
| | | | | 701/117 |
| 2012/0098652 A1 | 4/2012 | Varella et al. | | |
| 2012/0109798 A1* | 5/2012 | Shelton | ............ | B60L 53/54 |
| | | | | 705/34 |
| 2012/0143914 A1* | 6/2012 | Lang | ............ | G06Q 50/01 |
| | | | | 707/779 |
| 2012/0250540 A1 | 10/2012 | Smartt et al. | | |
| 2012/0250938 A1* | 10/2012 | DeHart | ............ | G08G 1/127 |
| | | | | 382/103 |
| 2013/0024060 A1 | 1/2013 | Sukkarie et al. | | |
| 2013/0072172 A1* | 3/2013 | Chang | ............ | H04W 4/16 |
| | | | | 455/417 |
| 2013/0080345 A1 | 3/2013 | Rassi | | |
| 2013/0082820 A1* | 4/2013 | Tieman | ............ | G07C 9/00309 |
| | | | | 340/5.61 |
| 2013/0204678 A1 | 8/2013 | Liu et al. | | |
| 2013/0231854 A1 | 9/2013 | Rovik et al. | | |
| 2015/0066940 A1* | 3/2015 | Fernandes | ............ | G06Q 10/10 |
| | | | | 707/740 |

OTHER PUBLICATIONS

Mechanism for True Opinion Sharing, The IP.com Prior Art Database, Dec. 13, 2018. (Year: 2018).*

Research on the Operation System of Online Community in Automobile Manufacturers, : 2011 International Conference on Information Management, Innovation Management and Industrial Engineering (vol. 1, pp. 362-365), Jiqiu Guo Zheming Zhong, Nov. 1, 2011. (Year: 2011).*

Wikipedia., "AirDrop," Retrieved from Internet: "https://en.wikipedia.org/w/index.php?title=AirDrop&oldid=898209007" May 22, 2019.

* cited by examiner

SYSTEM AND METHOD FOR FACILITATING ONLINE OPINION SHARING ABOUT PROXIMATE MOTOR VEHICLES WITH THE AID OF A DIGITAL COMPUTER

CROSS-REFERENCE TO RELATED APPLICATION

This non-provisional patent application is a continuation-in-part of U.S. patent application Ser. No. 13/928,292, filed Jun. 26, 2013, abandoned, the disclosure of which is incorporated by reference.

FIELD

This application relates in general to providing online communities and, in particular, to a computer-implemented system and method for facilitating online opinion sharing about proximate motor vehicles with the aid of a digital computer.

BACKGROUND

Social networking sites have become a popular tool to express and share opinions online. Members of social networking sites, such as "Facebook," provided by Facebook, Inc., Menlo Park, Calif., "Twitter," provided by Twitter, Inc., San Francisco, Calif., "MySpace," provided by Specific Media LLC, Beverly Hills, Calif., "Google+," provided by Google Inc., Mountain View, Calif., and LinkedIn, provided by LinkedIn Co., Mountain View, Calif., can exchange opinions with other users within their network, such as "friends," "followers," "connections," and so forth. Further, mobile device technologies expedite the popularity of such social networking sites, as software written for mobile devices, called "apps," enables the users to remotely engage in online opinion sharing.

As an online interpersonal communications tool, each social networking site allows the members to comment and vote on topics or items of interest. The comments and votes can be kept private or shared with other members within a social networking community, which are formed based on friendship, interest or cause, and so forth. However, membership in the communities is limited and outsiders at-large, including users who do not have an account with the social networking site, are excluded. For instance, a community to discuss a particular motor vehicle may be formed within a social networking site and the members of that social networking site may comment or vote on the motor vehicle. However, other members of the social networking site who are not a member of the community and outside non-members are precluded from participating, even if they know of the community's existence.

Further, an opinion sharing community for discussing a particular motor vehicle does not have much universality as an open community due to its limited topics and targeted audience. For instance, such a community targets a specific group of people, such as a person who saw the particular motor vehicle on the street, parking lot, somewhere in the neighborhood, and so forth, and provides no easy way to inform such a group of people that they can share opinions regarding the particular motor vehicle. Further, such a community has limited applicability. Thus, a community that only covers narrow topics and which is targeted to a small group of people cannot function as an open opinion sharing community.

Services facilitating personal interactions using social networking sites are known. For instance, putting a message on a display installed in the rear window of a motor vehicle is disclosed in U.S. Patent App. Pub. No. 2012/0098652. A user of the display, typically a driver, may send or receive a message from a designated Web site or other social networking site to a display equipped on the rear portion of a motor vehicle. In addition, the user can further share the message exhibited on the display to multiple email addresses and Web sites with others. However, the message display service is limited for sharing messages with members within an existing community of the display user.

Further, a social networking service for facilitating in-person interactions, such as electronic dating or social networking, via mobile devices is proposed in U.S. Patent App. Pub. No. 2011/0035445. The service is provided to identify other users in the proximity by tracking specific information indicia of the users and to display those users in the proximity and their profiles on the mobile device. Users may contact other users through the service platform. However, the users of the service need to be previously registered as a member, and further, the service is performed only to the users in the proximity of each other.

In addition, a communication tool to send SMS-based texts between a motor vehicle owner and others has been proposed as "CurbTXT," a texting service for motor vehicle owners. By registering with CurbTXT, a motor vehicle owner can receive a text message from anyone else who sent the text message via CurbTXT using a license plate number of a motor vehicle. CurbTXT enables communication between unknown people while keeping the identities of both parties private. For instance, when a third party sees a CurbTXT participant's motor vehicle being towed, the third party may send a text to the motor vehicle owner through the CurbTXT that his motor vehicle is being towed. However, to receive CurbTXT text messages, the motor vehicle owner needs to be initially registered with CurbTXT. Further, the communication on CurbTXT is limited in mobile phone users who can receive SMS-based texts from others. In addition, no feedback communication from the motor vehicle owners to others are possible.

Further, sometimes an individual notes a particular vehicle that he or she would like to discuss while driving. Under such circumstances, the individual may not always be able to write down the license plate of the vehicle of interest, and by the time the individual stops driving, the identifying information about the vehicle of interest fades in the individual's memory and the individual may not be able to identify the vehicle, or worse, misidentifies the vehicle.

Accordingly, there is a need to facilitate online opinion sharing about a particular motor vehicle between motor vehicle drivers and others anywhere and anytime. There is a further need to enable an individual to capture identifying information about a particular vehicle while the individual is driving.

SUMMARY

Identifying indicia of a proximate motor vehicle can be efficiently obtained using a computing device executing a mobile application that can utilize a variety of internal and external sensors. The mobile application can also obtain the identifying indicia from other devices executing the mobile application when those devices are within range of short-range wireless transceiver communication. The use of the mobile application allows to obtain the identifying indicia even when the user of the mobile application is driving. The obtained identifying indicia can be provided to an online motor vehicle voting service via a data communications network, with the service creating using the identifying indicia one or more social networking site pages for voting about the motor vehicle, redirecting a user associated with the computing device to the one or more voting pages via the computing device, and tallies one or more votes received at the voting page from one or more additional users and one or more votes received at the voting page from the user. The voters and the driver whose vehicle is being discussed can also communicate with each other, either via the online motor vehicle voting service or via the short-range wireless transceivers of their computing devices when the voters and the driver are proximate to each other. One embodiment provides a computer-implemented system and method for facilitating online opinion sharing about motor vehicles. Motor vehicle identifying indicia uniquely identifying a motor vehicle about which an opinion can be shared is received from a voter who accessed a voter entry page of an online motor vehicle voting service via a user interface. The voter is redirected from the voter entry page to a voting page of a social networking site for sharing the opinion. Then, a plurality of opinions about the motor vehicle is tallied.

In a further embodiment, a system and method for facilitating online opinion sharing about proximate motor vehicles is provided. A mobile application executes on a computing device interfaced to a data communications network and comprising a processor and a short-range range wireless transceiver interfaced to the processor. The mobile application is configured to detect using the short-range wireless transceiver at least one further computing device that includes a further short-range wireless transceiver and that executes the mobile application; receive using the short-range wireless transceiver identifying indicia of a motor vehicle associated with an individual associated with the further computing device, wherein the identifying indicia is received from the further short-range wireless transceiver; and provide via the data communications network the identifying indicia to an online motor vehicle voting service implemented by an at least one server, wherein the service creates using the identifying indicia on one or more of social networking sites one or more pages for voting about the motor vehicle, redirects a user associated with the computing device to the one or more voting pages via the computing device, and tallies one or more votes received at the voting page from one or more additional users and one or more votes received at the voting page from the user.

Still other embodiments of the present invention will become readily apparent to those skilled in the art from the following detailed description, wherein are described embodiments by way of illustrating the best mode contemplated for carrying out the invention. As will be realized, the invention is capable of other and different embodiments and its several details are capable of modifications in various obvious respects, all without departing from the spirit and the scope of the present invention. Accordingly, the drawings and detailed description are to be regarded as illustrative in nature and not as restrictive.

DETAILED DESCRIPTION

System

Motor vehicles are a large part of almost everybody's daily lives. Various types of transportation, such as passenger vehicles, buses, trains, ferries, bicycles, and airplanes are used for daily travels, such as commuting, working, and so forth. Car-related topics can be found in magazine articles, online forums, TV programs, and the like. In a sense, motor vehicles are almost a form of self-expression, whether that be a model or brand of car, a vehicle appearance or accessories, its occupants, how the car is being driven, or even possessional accoutrements, like vanity license plates or bumper stickers.

Figure 1:
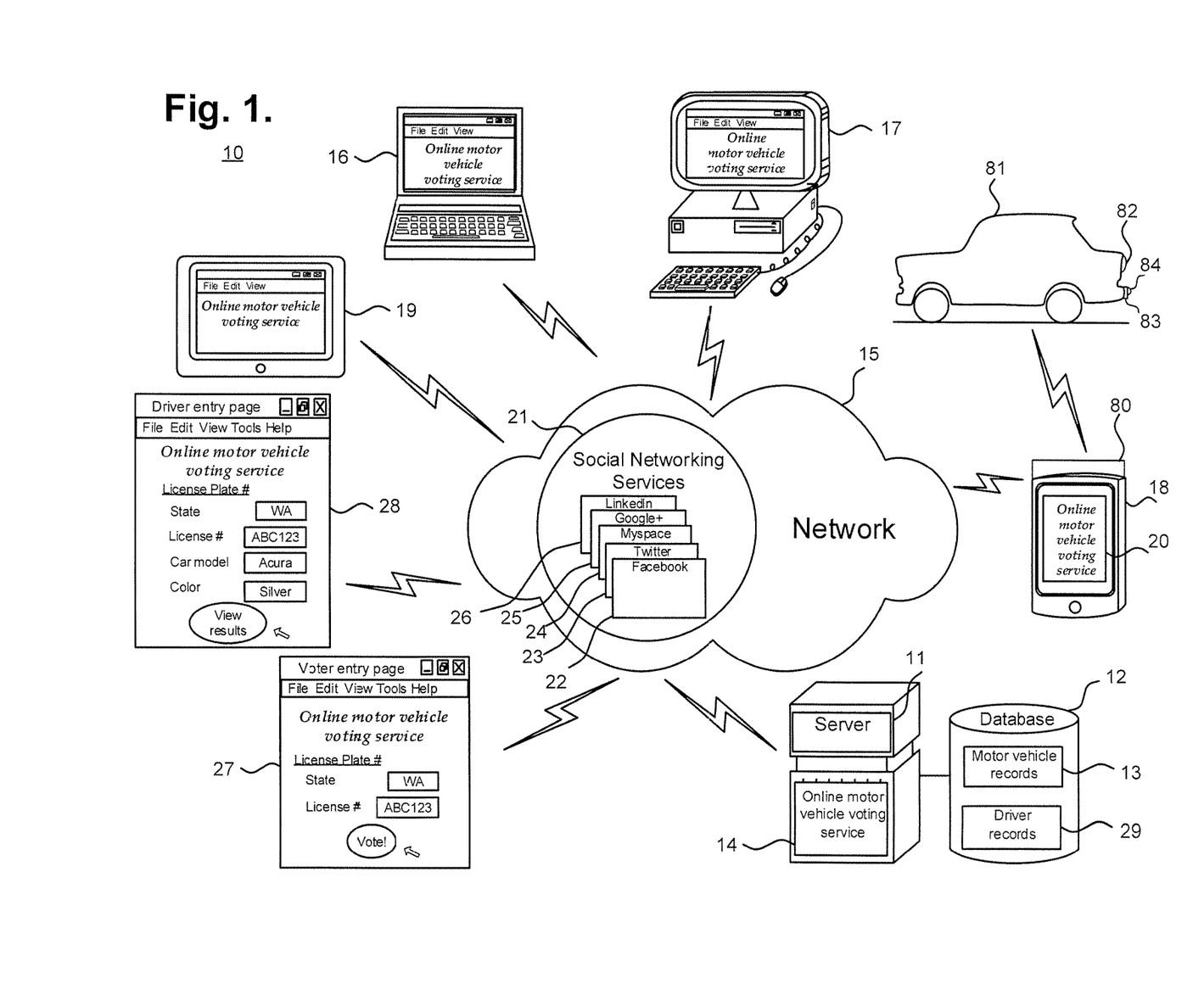
FIG. 1 is a functional block diagram showing a computer-implemented system for facilitating online opinion sharing about motor vehicles, in accordance with one embodiment.

Any topic regarding a motor vehicle, including the driver of the motor vehicle, or a bumper sticker, can be discussed and voted on in an online motor vehicle voting service that provides an open online community about all things of motor vehicle. By identifying a particular motor vehicle by a license plate number or similar identifying indicia, a participant of the online motor vehicle voting service can share an opinion about the particular motor vehicle while keeping details about the motor vehicle, owner, or related interests private. FIG. 1 is a functional block diagram showing a computer-implemented system 10 for facilitating online opinion sharing about motor vehicles, in accordance with one embodiment. The online motor vehicle voting service 14 is operated as a Web-based service, which is accessible through mobile device software 20 ("apps") or Web browsers, such as a voter entry page 27 and driver entry page 28.

The online motor vehicle voting service 14 is implemented by at least one server 11, which is connected to a database 12 for storing license plate numbers or similar identifying indicia as motor vehicle records 13. By way of example, a person, such as a pedestrian, driver, or passenger of a motor vehicle, perceives another motor vehicle parked or driven by another driver, and the person may have an opinion about the motor vehicle, that he wishes to share, such as model, appearance, driving skills, driver, or bumper sticker affixed to the motor vehicle. The person accesses the online motor vehicle voting service 14 as a voter through his mobile computing device or personal computer by using the license plate number or other identifying indicia of the motor vehicle, which he perceived.

The online motor vehicle voting service 14 is provided through the online motor vehicle voting service server 11 and can be remotely accessed via the Web over a wide area public data communications network 15, such as the Internet, using wired or wireless connections. Users interface with the server 11 through a Web browser 20 executing on user devices 16-19. The server 11 is operatively coupled to a database 12, within which stores motor vehicle records 13 and driver records 29. Both the user devices 16-19 and the online motor vehicle voting service server 11 include components conventionally found in general purpose programmable computing devices, such as a central processing unit, memory, input/output ports, network interfaces, and non-volatile storage, although other components are possible, as well as other types of computer systems.

Voters may access the online motor vehicle voting service 14 via a wide area public data network 15, such as the Internet, or other network infrastructure from a personal or laptop computer 16, 17, or mobile computing device, such as a smart phone 18 or tablet computer 19. Other types of data communication networks are possible. A license plate number 13 or other identifying indicia is provided by a voter of the online motor vehicle voting service 14 for voting or comment and used for identifying the motor vehicle to the online motor vehicle voting service 14.

In one embodiment, the identifying indicia can be manually input by the user of the service 14 (in this case, a voter) into the online motor vehicle voting service 14, such as after the user sees a license plate 13 of a car. In a further embodiment, the identifying indicia can be obtained using the user device 16-19, automatically or with minimal user input, and allowing the user to capture identifying indicia of proximal vehicles when driving.

For example, people often carry their user devices 16-19, especially smart phones 18, with them while driving, and if they are willing to have their driving discussed, these people can set the app 20 on their devices 16-19 to transmit the identifying indicia of their vehicles to other nearby individuals (such as other drivers on the road or pedestrians) whose user devices 16-19 also execute the app 20. In particular, the app 20 can use short-range wireless transceivers within a user device 16-19 to periodically check and detect other user devices 16-19 executing the app 20 that are within a certain range (and that also include a short-range wireless transceiver). The proximity within which the other devices 16-19 executing the app 20 are detected depends on the range of the short-range transceivers within the devices 16-19 of all users. For example, if the transceivers of the all user devices 16-19 utilize the Bluetooth® 5.0 standard, the range within which other devices executing the application 20 can be detected is 800 feet. Other transceiver standards and possible ranges are possible.

Once the app 20 executing on a user device 16-19 of one user detects user devices 16-19 of other users also executing the app 20, the apps 20 can transmit the identifying indicia of the vehicle of the one user to the user devices 16-19 of the other users via the short-range wireless transceivers of the respective user devices 16-19. When the app 20 of all of the users involved is set to share the identifying indicia with other nearby app 20 users, the apps 20 of these users exchange identifying indicia of their vehicles.

The kind of identifying indicia that is shared by the app 20 can be preset by each of the users, allowing the users to control the information that is shared. Thus, if an individual has multiple cars, the individual can set the app 20 to transmit the identifying information specific to a particular car when the individual is driving that car.

The following is example is given for the purposes of illustration, and not limitation. Alice and Bob are both driving Interstate 5 near Downtown Seattle. Alice is in possession of a smart phone 18 executing the app 20, with the app 20 being set to share the license plate number and a description of the red SUV that Alice is currently driving with other nearby users of the app 20. Bob is in possession of a tablet 19 executing the app 20, with the app 20 being set to share the license plate number and a description of the black sedan that Bob is currently driving with other nearby users of the app 20. The app 20 running on both the smart phone 18 and the tablet 19 periodically checks for presence of other user devices 16-19 executing the app 20 within the range of the short-range wireless transceivers within the smart phone 18 and the tablet 19 respectively. When Bob's sedan and Alice's SUV come close enough to each other to be within range of the respective short-range wireless transceivers, the app 20 on Bob's tablet 19 detects Alice's smart phone 18 executing the app 20 and the app 20 on Alice's smart phone 18 detects Bob's tablet 19 executing the app 20. Upon the detection, the app 20 executing on Alice's smart phone 18 sends the license plate number and the description of Alice's red SUV to the app 20 executing on Bob's tablet via the short-range wireless transceiver on the smart phone 18. Likewise, the app 20 executing on Bob's tablet 19 sends the license plate number and the description of Bob's black sedan to the app 20 executing on Alice's smart phone 18 via the short-range wireless transceiver on the tablet 19. Thus, Alice and Bob exchange the identifying indicia of their vehicles after being close to each other on the road.

The identifying indicia of vehicles of other users is presented by the apps 20 via the user devices 16-19 on which they execute, allowing the user to select the identifying indicia of one of the vehicles for submission into the service 14. In one embodiment, the app 20 displays to a user only the identifying indicia of vehicles received from user devices 16-19 of other users that are currently proximal. Thus, returning to the example above, if Bob could check his tablet 19 when his sedan was proximate to Alice's SUV, the app 20 would display the license plate number and description of Alice's SUV to Bob. In a further embodiment, the app 20 can also display identifying indicia of vehicles received from user devices 16-19 that were proximal within a predefined period of time. Thus, if an individual in possession of a user device 16-19 executing the app 20 cannot safely use the device 16-19, but nevertheless wants to comment on a nearby vehicle whose driver is also in possession of a user device 16-19 executing the app 20, the individual can obtain the identifying indicia of that driver's vehicle from the app 20 after the individual has a chance to stop and use the app 20 in safe conditions. Returning to the example above, if Alice saw Bob do an unsafe maneuver on Interstate 5, but could not safely reach for her phone 18 while on the road, Alice could retrieve Bob's license plate and the description of his sedan from the mobile app 20 at a later time.

Similarly, the user devices 16-19 can use internal and external sensors to obtain the identifying indicia. For example, as further described below, the user devices 20 can use an internal or an external radio frequency identification (RFID) reader to read an RFID tag on a vehicle to obtain the identifying indicia of the vehicle. In a case of an external RFID reader, the user device 16-19 can either be physically interfaced to the RFID reader (as shown with reference to FIG. 1, where an external RFID reader 80 is physically attached to a smart phone 18) or wirelessly interfaced to the reader. The data obtained from the reading of the RFID tag is provided to the app 20, which in turn can provide the data to the service 14, which the service 14 can process and extract the identifying indicia. The user can cause the reading of an RFID tag within the range of the reader to be performed either by operating the a user device 16-19 manually, or in other ways (such as via a voice command issued to the app 20 operating on the user device 16-19) when the user is driving and cannot manually operate the user device 16-19. Thus, a user can capture RFID tags of proximal vehicle (within the range of the RFID reader) even while driving.

Likewise, the user devices 16-19 can use internal and external video sensors to obtain the identifying indicia of a vehicle. For example, a user device 16-19 can use a built-in camera to capture a photograph of the vehicle or other visible marker on the vehicle, such as a Vehicle Identification Number (VIN), bar code, grid, image tag, or numeric, alphabetic, or symbolic sequence or combination thereof. The captured image is provided by the app 20 (or via an internet browser) to the service 14, which can process the received image and extract identifying indicia.

In a case of external video sensors, the app 20 can wirelessly interface with video sensors located in or on the vehicle 81 of the app 20 user to capture the identifying indicia of proximal vehicles. For example, such vehicle sensors can be cameras built-into the car 81 (such as a backup camera 82 or forward-facing camera) and can be used to capture a photograph of a vehicle in front or behind the voter's vehicle 80. The app 20 can wirelessly interface with such integral sensors via a wireless transceiver included in the user device 16-19 on which the app 20 executes and a wireless transceiver interfaced to the integral sensor. In a further embodiment, the app 20 can wirelessly interface with stand-alone external video sensors, such as dash cams or video sensors 84 that are removably attached to an exterior of the voter's vehicle 81 (such as being attached to the license plates 83 of the vehicle 81), to capture a photograph with the identifying indicia of the cars ahead or behind the voter's vehicle. In addition to any circuitry and parts necessary to capture an image, such sensors 84 can include a power supply, a controller, and a wireless transceiver, which allow the sensor 84 to capture an image and wirelessly provide the image to the app 20.

The user can cause the user device 16-19 to capture a photograph through an internal or an external video sensor by either manually operating the user device 16-19 in control of the sensor or in other ways (such as via a voice command issued to the app 20 operating on the user device 16-19) when the user is driving and cannot manually operate the user device 16-19. Thus, a user can capture identifying indicia of proximal vehicles even while driving. By being able to capture identifying information of a proximal vehicle when the user is driving, the app 20 allows the user to initiate the opinion sharing immediately after, or soon after, the act that the user would like to share the opinion about. In one embodiment, when the app 20 can be controlled via the user's voice, the user can complete the online opinion sharing (discussed further below) entirely while driving.

The online motor vehicle voting service 14 can take action upon receiving the identifying indicia. The online motor vehicle voting service server 11 is connected via the network 15 to social networking sites 21, such as Facebook 22, Twitter 23, MySpace 24, Google+ 25, and LinkedIn 26. Other social networking sites are possible. In one embodiment, the voter may access a voter entry page 27 of the online motor vehicle voting service 14 and input a license plate number into a field provided on the voter entry page. Then, for voting, the voter may be redirected to one of social networking sites 22-26. Hyperlinking or any other forms of web service are possible. The online motor vehicle voting service 14 or voters may create categories for display on each social networking site 22-26. The voting category may include "Do you like my car?," "Do you like my bumper sticker?," and so forth. The online motor vehicle voting service 14 periodically tallies and updates a total count of the votes for displaying the tallied votes on a voting tally page (not shown) of the social networking site.

In addition, the online motor vehicle voting service 14 provides a driver entry page 28 for a driver of the motor vehicle and redirects the driver to a voting tally page of the social networking site for displaying the tallied votes. All the owners, custodians, or stakeholders of the motor vehicle, including a person equitable to an owner, company, governmental entity, or anyone behind the wheel, are simply referred to as a "driver" of a motor vehicle, which is used herein. By way of example, a driver of a motor vehicle may have an interest in opinions of others regarding her motor vehicle. Further, the driver may want to know whether others consider her driving skills to be good. In addition, the driver may be interested in hearing an opinion about her bumper sticker, such as "I ♥ Rain," affixed to the rear bumper of her motor vehicle.

On the other hand, a "How's my driving? Call 1-800-xxx-xxxx" sign on a commercial truck or a van may initiate conversation between the driver and others. Those motor vehicles with the sign are typically owned by a third party, such as a taxi company, trucking company, limousine company or delivery company. Thus, the owner of the motor vehicle, in this case, typically an employer of the driver, has an interest in knowing how well the driver is performing his work. However, such telephone numbers on the sign are often busy or are run by an automated service, and a caller is not guaranteed a chance to provide his verbal opinions about the driver in detail. Similarly, stakeholders, such as parents of the driver, may be eager to know how well his or her child drives their motor vehicle.

When a driver of the motor vehicle accesses the online motor vehicle voting service 14 through a mobile device 18, 19 or personal computer 16, 17, the online motor vehicle voting service 14 allows the driver to access a voting tally page on the social networking site if the driver provides motor vehicle characteristic information to the online motor vehicle voting service 14. On the voting tally page, the driver can see the voting results for the motor vehicle. In one embodiment, the driver may leave a comment for the results of each voting category or for the results in general.

In a still further embodiment, the online motor vehicle voting service 14 can enable direct communication between the voters and the driver. Thus, if the driver has previously interacted with the driver entry page 28 and the driver's contact information, such as the driver's username on the one or more social networks 21, is known, a voter may be given an option to send the driver a message via the service 14, such as via a messaging box provided on the voter entry page 27. Similarly, the online motor vehicle voting service 14 could forward a response message from the driver (received via one or more of the social networking sites 21 or through other ways) to the voter who sent the initial message to the driver (such as for presentation via that voter's app 20). The service 14 would not provide share the contact information of the voter and the driver to preserve their privacy. In a still further embodiment, the communication between a voter and a driver of the vehicle whose identifying indicia is captured can be performed via the short-range wireless transceivers under the control of the app 20. Thus, if two user devices 16-19 executing the app 20 and associated with different users are within range of communication of the short-range wireless transceivers, the two users can exchange messages directly, bypassing the online motor vehicle voting service 14. Thus one user can input a message into the app 20, with the app using the short-range wireless transceiver of the user device 16-19 on which the app 20 executes to the other device 16-19 within the range of the transceiver. The message is received by the short-range wireless transceiver of the user device 16-19 of the second user and presented by the app 20 via the user device 16-19 of the second user (such as on the screen of the device 16-19, though other presentation techniques are possible). Thus, two users of the app 20 can communicate with each other even if they do not have access to the Internet, as long as they are physically proximal.

The user devices 16-19 and the online motor vehicle voting service 14 can each include one or more modules for carrying out the embodiments disclosed herein. The modules can be implemented as a computer program or procedure written as source code in a conventional programming language and is presented for execution by the central processing unit as object or byte code. Alternatively, the modules could also be implemented in hardware, either as integrated circuitry or burned into read-only memory components. The various implementations of the source code and object and byte codes can be held on a computer-readable storage medium, such as a floppy disk, hard drive, digital video disk (DVD), random access memory (RAM), read-only memory (ROM) and similar storage mediums. Other types of modules and module functions are possible, as well as other physical hardware components. The at least one online motor vehicle voting service server 11 can be a dedicated server or located in a cloud-computing environment.

Method

Figure 2:
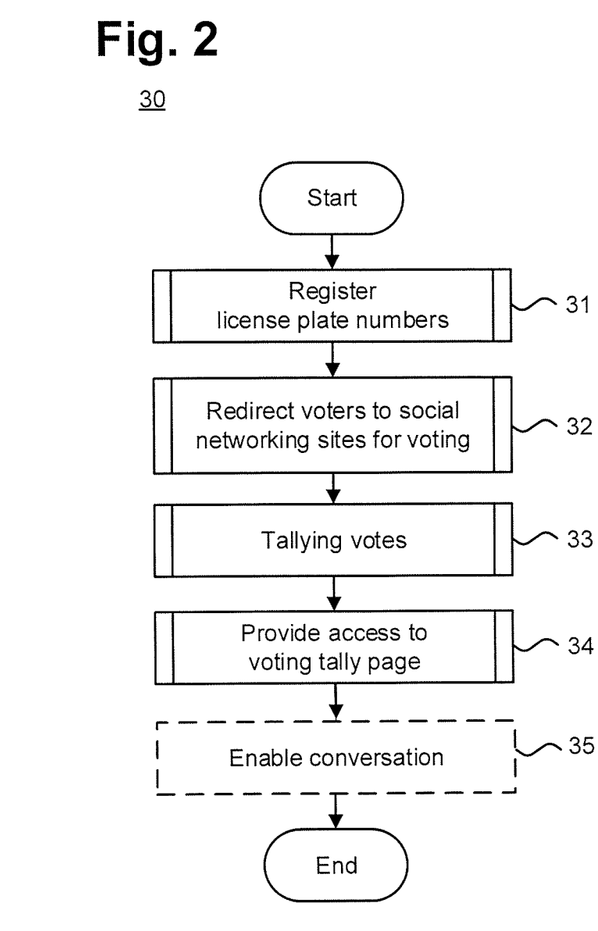
FIG. 2 is a flow diagram showing a computer-implemented method for facilitating online opinion sharing about motor vehicles, in accordance with one embodiment.

The online motor vehicle voting service 14 encourages people to share and exchange opinions about and vote for any particular motor vehicle or any motor vehicle related topic. By providing an open community to share opinions, the online motor vehicle voting service 14 may contribute to resolving or diffusing notable social problems concerning motor vehicles and their drivers, such as "road rage." FIG. 2 is a flow diagram showing a computer-implemented method 30 for facilitating online opinion sharing about motor vehicles, in accordance with one embodiment. The method 30 is performed as a series of process steps by the online motor vehicle voting service server 11 (shown in FIG. 1) or other computing device.

Figure 3:
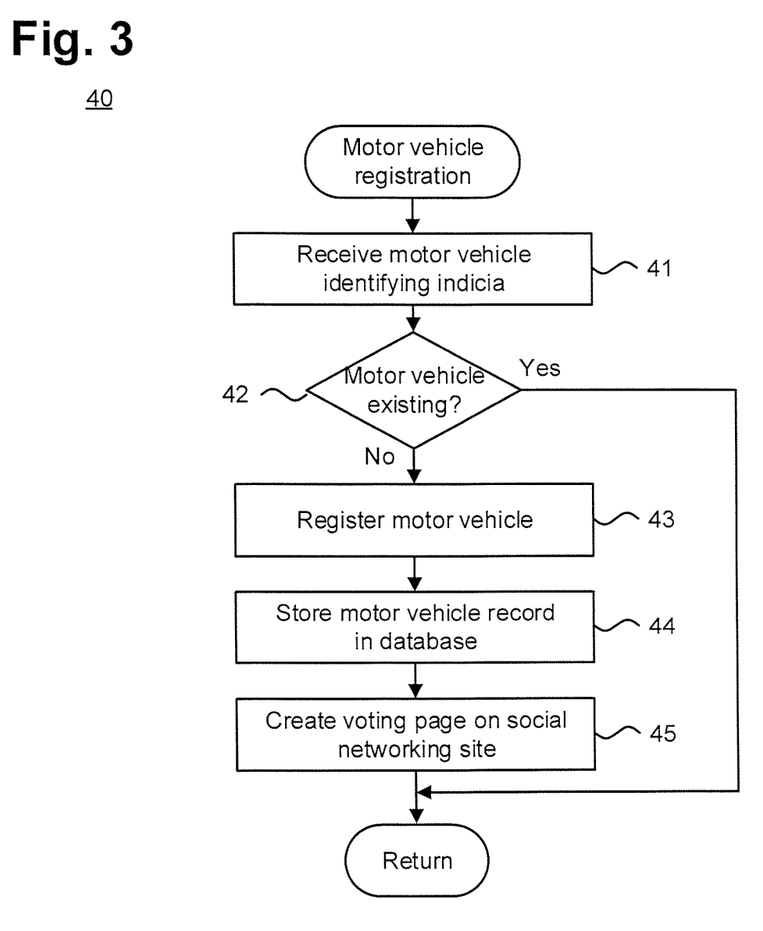
FIG. 3 is a flow diagram showing a routine for registering a motor vehicle identified by a license plate number or motor vehicle identifying indicia in the database for use in the method of FIG. 2.

As an initial step, license plate numbers or other motor vehicle identifying indicia are registered, and stored in the database 12 and further used for creating a voting page and a voting tally page on one or more social networking sites (step 31), as further described infra with reference to FIG. 3. Then, the online motor vehicle voting service 14 redirects a voter to a social networking site for voting (step 32), as further described infra with reference to FIG. 4. Votes made by the voters on the social networking site are tallied by the online motor vehicle voting service 14 (step 33), as further described infra with reference to FIG. 5. The online motor vehicle voting service 14 also redirects a driver of the motor vehicle to a voting tally page of the social networking site for showing voting results (step 34), as further described infra with reference to FIG. 6. Hyperlinks or any other forms of web serving are possible. Optionally, communication between the driver and one or more voters is performed (step 35), ending the method 30. Thus, if the contact information of the driver is known and a voter desires to send a message to the driver, the online motor vehicle voting service 14 sends the communication received by from the voter (such as via the app 20 or a web browser) to the driver at the contact information via the social networking service. Likewise, if a response from the driver is received by the online motor vehicle voting service (such as via the social networking sites), the online motor vehicle service sends the response to the app for presentation to the voter, thus enabling a conversation between the voter and the driver. In a further embodiment, the voter and the driver, when physically proximate, can communicate via the short-range wireless transceivers of their respective user devices, bypassing the online motor vehicle voting service, as described above with reference to FIG. 1.

Registration of License Plate Numbers

The online motor vehicle voting service 14 registers and stores license plate numbers or other motor vehicle identifying indicia in the database 12 for identifying a motor vehicle and redirecting a voter from the online motor vehicle voting service 14 to social networking sites, where a voting page on each social networking site is designated for the motor vehicle identified by the license plate number or other identifying indicia. FIG. 3 is a flow diagram showing a routine 40 for registering a motor vehicle indentified by a license plate number or other indicia in the database 12 for use in the method 30 of FIG. 2.

A voter accesses a voter entry page 27 (FIG. 1) of the online motor vehicle voting service 14 via a mobile device or personal computer. The voter entry page 27 can include a field to enter a license plate number, as well as other fields, including a state, symbols or slogans associated with the issuing jurisdiction, political statement to the state, a web address pertaining to the state, and so forth. Once accessed, the voter manually enters a license plate number of the motor vehicle that the voter wants to vote for into the field on the voter entry page 27 (step 41). Each license plate number, regardless of state, generally contains a combination of numbers and letters and a state name where the license plate was registered. Thus, the combination of the numbers and letters uniquely identifies a motor vehicle while preserving the privacy of the driver of the motor vehicle or voter.

In a further embodiment, the voter can provide information to identify a motor vehicle, other than inputting a license plate, such as a photograph of the motor vehicle. As further described in detail with reference to FIG. 1, such identifying indicia can include indicia captured using one or more sensors included in or interfaced to a user device of the voter. Similarly, the identifying indicia can be obtained by the mobile application from other computing devices executing the mobile application via short-range wireless transceiver communications. For instance, the online motor vehicle voting service 14 can process a photographed license plate of a motor vehicle for identifying the license plate number. In still a further embodiment, the voter can provide other vehicle identifying indicia, including an identification tag. The identification tag can be passive, that is, physically visible, such as a Vehicle Identification Number (VIN), bar code, grid, image tag, or numeric, alphabetic, or symbolic sequence or combination thereof, or active, such as provided through wireless communications, such as a transmitted radio frequency identification (RFID) tag. The online motor vehicle voting service 14 may include recognition software or hardware to identify or decode each identification tag. Other methods of motor vehicle identification are possible.

Once provided, the license plate number or other identifying indicia is first compared with a list of motor vehicles stored in the database 12 to determine whether an entry for that vehicle exists (step 42). If there is no registered record of the license plate number or other identifying indicia in the database 12, the motor vehicle is registered (step 43). The newly registered license plate number or other identifying indicia is stored (step 44) in the database 12. After the online motor vehicle voting service 14 identifies the motor vehicle, the online motor vehicle voting service 14 creates a voting page on a social networking site (step 45), such as Facebook, Twitter, MySpace, or Google+, for each registered motor vehicle. The social networking sites can be selected based on a default list. Alternatively, a voter can choose the social networking site to which the voter would like to be redirected to via a pop-up window, menu, or a new page and so forth. If the voter is not registered with the desired social networking site, sign up information can be collected with the use of social networking site, such as via the pop-up window, menu, or a new page, so that the voter is automatically redirected to the social networking site with authentification. However, in a further embodiment, the voter does not have to be registered with the social networking site to add a motor vehicle. Other methods for connecting to social networking sites are possible. If the motor vehicle record 13 already exists (step 42), then online motor vehicle voting service 14 automatically redirects the voter to the social networking site.

Voting

Figure 4:
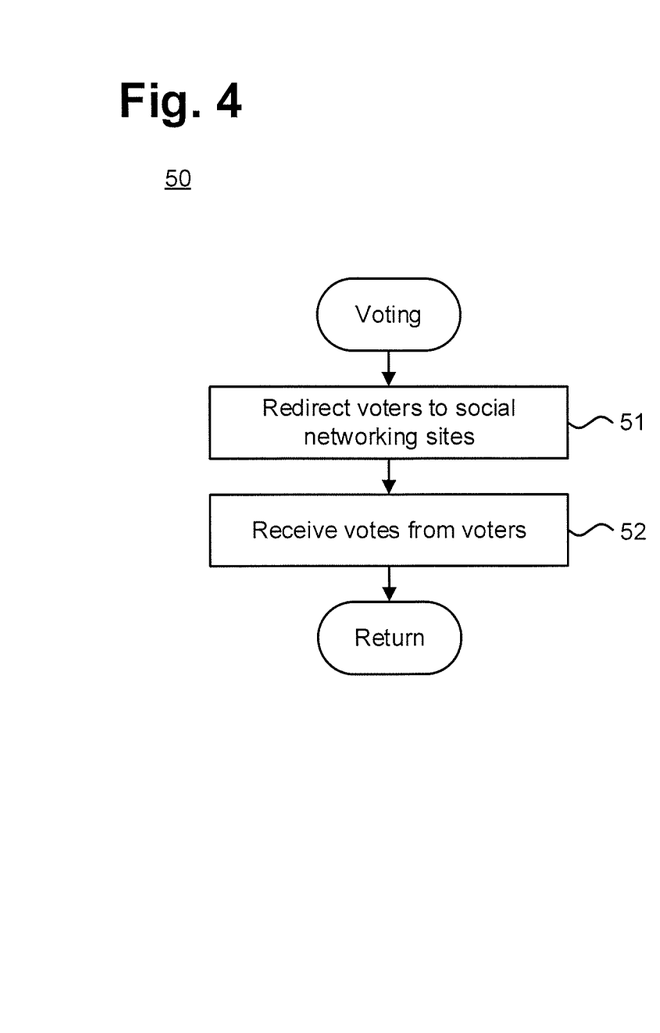
FIG. 4 is a flow diagram showing a routine for voting or making a comment through a voter entry page of the online motor vehicle voting service for use in the method of FIG. 2.

Voters can vote for any topic regarding a motor vehicle on a voting page of a social networking site via a voter entry page 27 of the online motor vehicle voting service 14. FIG. 4 is a flow diagram showing a routine 50 for voting through a voter entry page 27 of the online motor vehicle voting service 14 for use in the method 30 of FIG. 2. A voter is redirected to the voting page of the social networking site from the voter entry page 27 of the online motor vehicle voting service 14 (step 51). The online motor vehicle voting service 14 manages the voting page of the social networking site for each motor vehicle identified by the license plate number or other identifying indicia. The voting page provide categories for voting which can be provided by the online motor vehicle voting service 14 or created by voters. In one embodiment, the social networking site can list a category of car-related topics to vote. For instance, each category can include questions or issues on which the voters can vote. For example, a category of driving performance can include questions, such as "Does the driver abide by the driving rules?," "Does the driver follow traffic signs?," "Does the driver follow other cars too close?," and "Does the driver follow the speed limit?" In a different example, the category can include a car style, such as "Do you like the color of my car?," "Is the tint on my windows too dark" and "Do you like my new wheels?." Each question or issue point can include predetermined answers on which voters can vote (step 52). The answers can include words, phrases, rankings, and numerical values. For instance, for a question "Does the driver follow the speed limit?," the answers can include "Yes, always," "Most of the time," "Sometimes," and "Never," or a continuum or range of votes, such as one person representing "Never" and 10 people representing "Always." The voters can then provide answers as a comment under a posting. Further, Facebook allows users to "Like" posts and comments, which can also be considered as a vote. Returning to the above example, a voter may place a vote to the speeding question by writing a comment of "Most of the time." Another user can like the comment and can count as a vote for the answer of "Most of the time." Other examples of votes can include "+1" for Google or "Tweet" for Twitter. In a further embodiment, open ended answers from the voters can be accepted. Other types of the categories and answers are possible.

Tallying Votes

Figure 5:
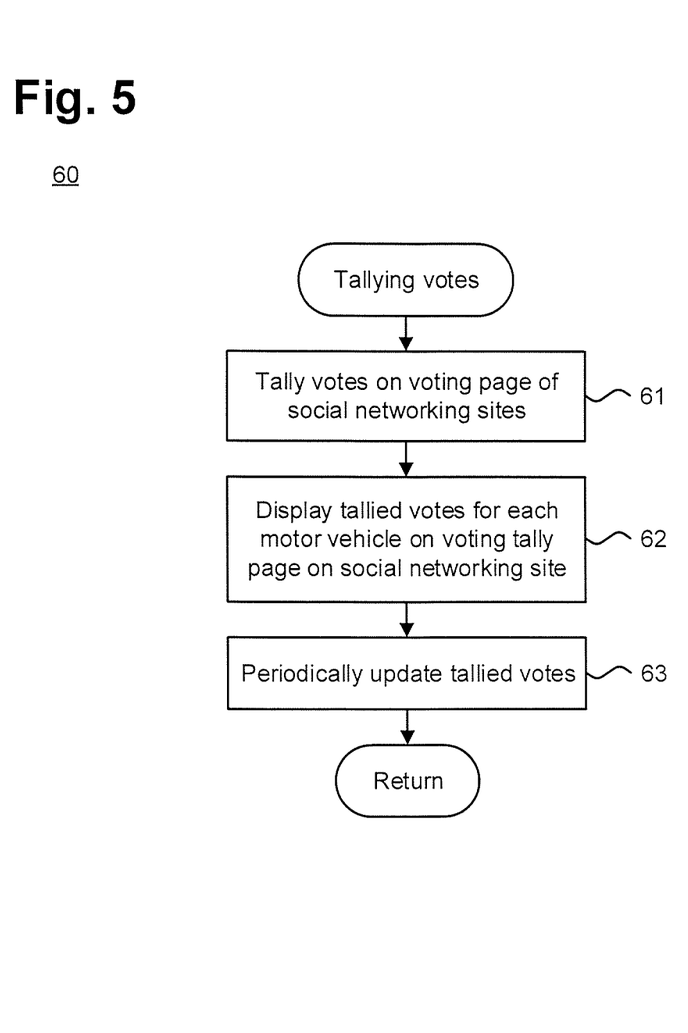
FIG. 5 is a flow diagram showing a routine for tallying votes for use in the method of FIG. 2.

The online motor vehicle voting service 14 tracks all the votes made on each voting page of the social networking sites via the online motor vehicle voting service 14. FIG. 5 is a flow diagram showing a routine 60 for tallying votes for use in the method 30 of FIG. 2. When a voter votes on the voting page of the social networking site, votes for each voting questions are tallied by the online motor vehicle voting service 14 (step 61). The total votes for each voting category are provided on a voting tally page of the social networking site (step 62). Those tallies are periodically updated by the online motor vehicle voting service 14 (step 63). For instance, the tallies can be updated at a predetermined time, randomly, on an as needed basis, or after a predetermined time span from the last update. In one embodiment, the tallied votes for each voting questions or issues may be consolidated by each motor vehicle.

Providing Vote Tallies

Figure 6:
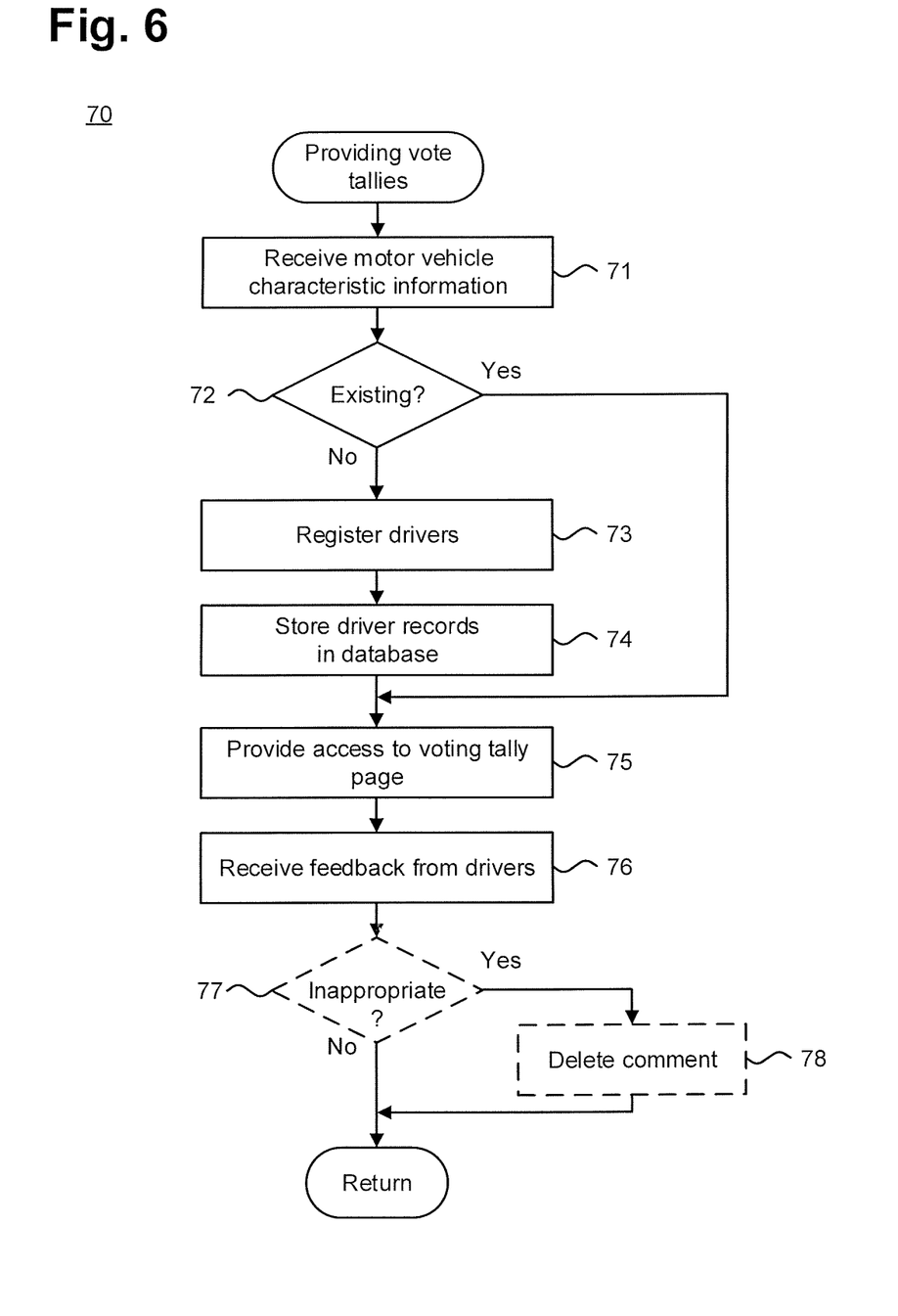
FIG. 6 is a flow diagram showing a routine for displaying the tallied votes to the driver of the motor vehicle for use in the method of FIG. 2.

A driver of a motor vehicle may also share opinions via the online motor vehicle voting service 14. By providing tallied votes regarding his motor vehicle to the driver, the online motor vehicle voting service 14 creates a two-way channel of communication between voters and drivers. FIG. 6 is a flow diagram showing a routine 70 for providing the tallied votes to the driver of the motor vehicle for use in the method 30 of FIG. 2. A driver of a motor vehicle can access a driver entry page 28 on the online motor vehicle voting service 14. However, the driver may be required to register as an owner of the online motor vehicle voting service 14, such as providing characteristics of the motor vehicle, such as a license plate number, brand name, color, or model year of the motor vehicle (step 71). When a driver signs up for the online motor vehicle voting service 14 with the characteristic information to identify his motor vehicle and no record is found in the database 12 (step 72), the driver record 29 is created (step 73). All the received characteristic information regarding the motor vehicle is stored as a part of the driver record 29 in the database 12 (step 74). Thus, there is no need to provide the driver's private information, such as a name, address, social security number, and so forth, to the online motor vehicle voting service 14 for viewing the tallied votes. In a further embodiment, the driver can provide his account information of the social networking sites. If the driver record 29 already exists (step 72), then the online motor vehicle voting service 14 automatically redirects the driver to a voting tally page of the social networking site for viewing the tallied votes (step 75).

The voting tally page on the social networking site typically displays the voting results for each voting category. For instance, for a license plate number "WA ABC123," a driver of the motor vehicle can see the tallied votes for a voting category of "Do you like my car?" as 305 votes for "Yes" and 52 votes for "No," or "How do you like my bumper sticker?" as 43 votes for "Good" and 678 votes for "Bad." In one embodiment, the driver may vote or leave feedback regarding the voting results on the voting tally page (step 76). The driver may also leave a comment regarding the voting results generally. Other feedback is possible. To maintain a quality of service, the online motor vehicle voting service 14 may periodically inspect votes and comments left for each motor vehicle (step 77). If the online motor vehicle voting service 14 or moderator finds an inappropriate comment or voting category, the online motor vehicle voting service 14 may unilaterally delete the comment or voting category from the voting page and voting tally page (step 78).

While the invention has been particularly shown and described as referenced to the embodiments thereof, those skilled in the art will understand that the foregoing and other changes in form and detail may be made therein without departing from the spirit and scope.

What is claimed is:

1. A system for facilitating online opinion sharing about proximate motor vehicles with the aid of a digital computer, comprising:
  a mobile computing device associated with a user and interfaced to a data communications network, the mobile computing device comprising a memory storing identifying indicia of a motor vehicle associated with the user, a processor interfaced to the memory and executing a mobile application, and a short-range range wireless transceiver interfaced to the processor, the mobile application configured to:
    periodically check for a presence of further mobile devices that are executing the mobile application and that are within a communication range of the short-range wireless transceiver, each of the further mobile devices being associated with a further user different than the user and comprising a further short-range wireless transceiver capable of communication with the short-range wireless transceiver when within the communication range;
    upon detecting the presence one or more of the further mobile devices within the communication range, receive using the short-range wireless transceiver identifying indicia of one or more further motor vehicles from one or more of the further short-range wireless transceivers of the further mobile computing devices whose presence was detected, each of the further motor vehicles associated with the different user that is associated with one of the further computing devices whose presence was detected;
    provide using the short-range wireless transceiver the identifying indicia associated with the motor vehicle associated with the user to the further short-range wireless transceivers of the one or more further mobile devices whose presence was detected;
    store the received identifying indicia for the further motor vehicles in the memory of the mobile computing device;
    retrieve the identifying indicia for the further motor vehicles received during a time period in the past from the memory of the mobile computing device based on a command from the user and display the retrieved identifying indicia on a display of the mobile computing device;
    receive a user selection of one of the identifying indicia for one of the further motor vehicles displayed on the mobile computing device display; and
    provide via the data communications network the selected identifying indicia to an online motor vehicle voting service implemented by an at least one server, wherein the server creates using the provided identifying indicia on one or more of social networking sites one or more pages for voting about the further motor vehicle whose identifying indicia was provided to the service, redirects the user associated with the mobile computing device to the one or more voting pages via the mobile computing device, and tallies one or more votes received at the voting page from one or more additional users and one or more votes received at the voting page from the user.

2. The system according to claim 1, further comprising:
  the mobile application further configured to:
    receive a message from the user of the mobile application directed at the different user associated with the further motor vehicle whose identifying indicia was provided to the online motor vehicle voting service; and
    provide the message to the server via the data communications network; and
  the server configured to provide the message to the individual different user via the one or more social networking sites.

3. The system according to claim 2, the server further configured to receive a further response from the different user via the one or more social networking sites and to provide the further message via the data communications network to the mobile application for presentation to the user.

4. The system according to claim 1, the mobile application further configured to:
  receive a message from the user of the mobile application directed at the different user associated with the further motor vehicle whose identifying indicia was provided to the online motor vehicle voting service;
  send the message to the further mobile computing device via the short-range wireless transceiver;
  receive a further message from the further mobile computing device with the short-range wireless transceiver and present the further message to the user via the mobile computing device.

5. The system according to claim 1, further comprising:
  a radio frequency identifier (RFID) reader under a control of the mobile application configured to read an RFID tag, the reading comprising further identifying indicia of the motor vehicle;
  the mobile application further configured to provide the reading to the server via the data communications network; and
  the server configured to extract the further identifying indicia from the reading, wherein the server creates the one or more pages using the further identifying indicia.

6. The system according to claim 1, further comprising:
  one or more video sensors interfaced to the mobile application and comprised at least one of on the motor vehicle and within the motor vehicle, the one or more video sensors configured to capture a photograph of the further motor vehicle whose identifying indicia was provided to the online motor vehicle voting service, wherein the photograph comprises further identifying indicia of the further motor vehicle;
  the mobile application further configured to provide the photograph to the server via the data communications network; and
  the server configured to extract the further identifying indicia from the photograph, wherein the server creates the one or more pages using the further identifying indicia.

7. The system according to claim 6, wherein the video sensors are integrated within the further vehicle.

8. The system according to claim 6, wherein the video sensors are removably attached to an exterior of the further vehicle.

9. The system according to claim 1, the server configured to provide the tallied opinions about the further motor vehicle whose identifying indicia was provided to the online motor vehicle voting service to the different user associated with the further motor vehicle on the voting tally page of the social networking site.

10. The system according to claim 1, the server configured to provide a plurality of voting categories for the voter on the voting page of the social networking site.

11. A method for facilitating online opinion sharing about proximate motor vehicles with the aid of a digital computer, comprising:
maintaining in a memory of a mobile computing device associated with a user, the mobile computing device interfaced to a data communications network and comprising a processor interfaced to the memory and a short-range wireless transceiver, identifying indicia of a motor vehicle associated with the user;
periodically checking by the mobile application for a presence of further mobile devices that are executing the mobile application and that are within a communication range of the short-range wireless transceiver, each of the further mobile devices being associated with a further user different than the user and comprising a further short-range wireless transceiver capable of communication with the short-range wireless transceiver when within the communication range;
upon detecting the presence one or more of the further mobile devices within the communication range, receiving by the mobile application using the short-range wireless transceiver identifying indicia of one or more further motor vehicles from one or more of the further short-range wireless transceivers of the further wireless transceivers whose presence was detected, each of the further motor vehicles associated with the different user that is associated with one of the further computing devices whose presence was detected;
providing by the mobile application using the short-range wireless transceiver the identifying indicia associated with the motor vehicle associated with the user to the further short-range wireless transceivers of the one or more further mobile devices whose presence was detected;
storing by the mobile application the received identifying indicia for the further motor vehicles in the memory of the mobile computing device;
retrieving by the mobile application the identifying indicia for the further motor vehicles received during a time period in the past from the memory of the mobile computing device based on a command from the user and displaying the retrieved identifying indicia on a display of the mobile computing device;
receiving by the mobile application a user selection of one of the identifying indicia for one of the further motor vehicle displayed on the mobile computing device display; and
providing by the mobile application via the data communications network the selected identifying indicia to an online motor vehicle voting service implemented by an at least one server, wherein the service creates using the identifying indicia on one or more of social networking sites one or more pages for voting about the further motor vehicle whose identifying indicia was provided to the service, redirects the user associated with the mobile computing device to the one or more voting pages via the computing device, and tallies one or more votes received at the voting page from one or more additional users and one or more votes received at the voting page from the user.

12. The method according to claim 11, further comprising:
receiving by the mobile application a message from the user of the mobile application directed at the different user associated with the further motor vehicle whose identifying indicia was provided to the online motor vehicle voting service;
providing by the mobile application the message to the server via the data communications network; and
providing by the server the message to the different user via the one or more social networking sites.

13. The method according to claim 12, further comprising:
receiving by the server a further response from the different user via the one or more social networking sites and providing by the server the further message via the data communications network to the mobile application for presentation to the user.

14. The method according to claim 11, further comprising:
receiving by the mobile application a message from the user of the mobile application directed at the different user associated with the further motor vehicle whose identifying indicia was provided to the online motor vehicle voting service;
sending by the mobile application the message to the further mobile computing device via the short-range wireless transceiver;
receiving by the mobile application a further message from the further mobile computing device with the short-range wireless transceiver and present the further message to the user via the computing device.

15. The method according to claim 11, further comprising:
reading by a radio frequency identifier (RFID) reader under a control of the mobile application an RFID tag, the reading comprising further identifying indicia of the motor vehicle;
providing by the mobile application the reading to the server via the data communications network; and
extracting the further identifying indicia from the reading, wherein the server creates the one or more pages using the further identifying indicia.

16. The method according to claim 11, further comprising:
capturing by one or more video sensors interfaced to the mobile application and comprised on at least one of on motor vehicle and within the motor vehicle a photograph of the further motor vehicle whose identifying indicia was provided to the online motor vehicle voting service, wherein the photograph comprises further identifying indicia of the further motor vehicle;
providing by the mobile application the photograph to the server via the data communications network; and
the server configured to extract the further identifying indicia from the photograph, wherein the server creates the one or more pages using the further identifying indicia.

17. The method according to claim 16, wherein the video sensors are integrated within the further vehicle.

18. The method according to claim 16, wherein the video sensors are removably attached to an exterior of the further vehicle.

19. The method according to claim 11, providing by the server the tallied opinions about the further motor vehicle whose identifying indicia was provided to the online motor vehicle voting service to the different user associated with the further motor vehicle on the voting tally page of the social networking site.

20. The method according to claim 11, providing by the server a plurality of voting categories for the voter on the voting page of the social networking site.

\* \* \* \* \*